United States Patent Office 3,133,952
Patented May 19, 1964

3,133,952
PARA-(BETA-CYANOALKYLAMINO)-
DIPHENYL AMINES
Richard H. Kline, Stow, Ohio, assignor to The Goodyear Tire & Rubber Company, Akron, Ohio, a corporation of Ohio
No Drawing. Filed May 31, 1960, Ser. No. 32,544
6 Claims. (Cl. 260—465)

This invention relates to the preservation of oxidizable compositions such as rubber and petroleum products and, more particularly, to the provision and use of para-(beta-cyanoalkylamino) diphenyl amines which are useful as age resistors for the various oxidizable rubbers and gasoline.

It is an object of the present invention to provide antioxidant and antiozonant compositions which are capable of protecting various oxidizable rubbers and petroleum products for extended periods of time. It is another object of this invention to provide para-(beta-cyanoalkylamino) diphenylamines which are capable of protecting various oxidizable rubbers and petroleum products from deterioration from oxygen, ozone, and/or sunlight.

In the practice of this invention, oxidizable compositions are protected from deterioration by incorporating in such compositions a small amount of a para-(beta-cyano-alkylamino) diphenylamine. Typical para-(beta-cyanoalkylamino) diphenyl amines of this invention can be further described as para-(beta-cyanoalkylamino) diphenylamines conforming to the following structure:

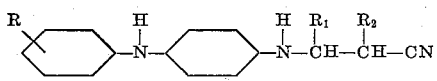

wherein R is selected from hydrogen, alkoxy radicals having from 1 to 9 carbon atoms, alkyl radicals having from 1 to 9 carbon atoms and aralkyl radicals having from 7 to 10 carbon atoms, and wherein $R_1$ and $R_2$ may be hydrogen or the same or different radicals selected from the group consisting of alkyl radicals having from 1 to 4 carbon atoms and phenyl radicals having from 6 to 9 carbon atoms.

Representative para-(beta-cyanoalkylamino) diphenylamines which are useful in the practice of this invention are compounds having the phenyl rings unsubstituted such as para-(beta-cyanoethylamino) diphenylamine, para-(alpha - methyl - beta - cyanoethylamino) diphenylamine, para - (alpha - phenyl - beta - cyanoethylamino) diphenylamine, para-(beta-methyl-beta-cyanoethylamino) diphenylamine, etc. Substituted para-(beta-cyanoalkylamino) diphenylamines which are useful in the practice of this invention include:

4-(beta-cyanoethylamino)-4'-methyldiphenylamine
4-(beta-cyanoethylamino)-2'-methyldiphenylamine
4-(beta-cyanoethylamino)-4'-methoxydiphenylamine
4-(beta-cyanoethylamino)-2'-methoxydiphenylamine
4-(beta-cyanoethylamino)-4'-ethyldiphenylamine
4-(beta-cyanoethylamino)-4'-ethoxydiphenylamine
4-(beta-cyanoethylamino)-4'-butyldiphenylamine
4-(beta-cyanoethylamino)-4'-octyldiphenylamine
4(alpha-methyl-beta-cyanoethylamino)-4'-methyldiphenylamine
4(alpha-methyl-beta-cyanoethylamino)-2'-methyldiphenylamine
4(alpha-methyl-beta-cyanoethylamino)-4'-methoxydiphenylamine
4(alpha-methyl-beta-cyanoethylamino)-2'-methoxydiphenylamine
4(alpha-phenyl-beta-cyanoethylamino)-4'-methyldiphenylamine
4(alpha-phenyl-beta-cyanoethylamino)-4'-methoxydiphenylamine The para-(beta-cyanoalkylamino) diphenylamines of this invention may be made by reacting a para-aminodiphenylamine with an unsaturated aliphatic nitrile. For best results, the reaction is carried out in the presence of an acidic catalyst such as acetic acid, oxalic acid, formic acid, chloroacetic acid, sulfuric acid, copper salts, and ammonia or amine salts of strong acids.

Examples of para-aminodiphenylamines which can be used in the practice of this invention are:

4-aminodiphenylamine
4-amino-4'-methyldiphenylamine
4-amino-2'-methyldiphenylamine
4-amino-4'-methoxydiphenylamine
4-amino-2'-methoxydiphenylamine
4-amino-4'-ethyldiphenylamine
4-amino-4'-ethoxydiphenylamine
4-amino-4'-butyldiphenylamine
4-amino-4'-octyldiphenylamine Examples of alpha,beta unsaturated aliphatic nitriles which can be used in the practice of this invention are:

acrylonitrile
crotonitrile
cinnamonitrile
alpha-methylacylonitrile

The preferred temperature at which the reactions of this invention are conducted is within the range of about 50° C. to 200° C. For best results, a temperature ranging from about 75° C. to 150° C. is preferred and the reaction is ideally conducted at the reflux temperature of the reaction system.

The invention may be further illustrated by means of the following examples which are not intended as limitations on the scope of the invention.

EXAMPLE I

One hundred eighty-four grams of para-aminodiphenylamine, 58 grams of acrylonitrile and 20 grams of glacial acetic acid were heated together at reflux temperatures for 5 hours during which time the temperature rose from 95 to 133° C. The mixture was cooled and the deposited solids were ground up and washed twice with ethyl alcohol. After drying, the product weighed 183.5 grams, which was a 78% yield, and had a melting point of 144–6° C. The product was para-(beta-cyanoethylamino) diphenylamine.

The compounds of this invention were tested as antioxidants in the following standard rubber formulation:

Extracted pale crepe _____ 100.0
Zinc oxide _____ 5.0
Sulfur _____ 3.0
Hexamethylenetetramine _____ 1.0

Stearic acid _____ 1.5
Antioxidant _____ 1.0

The stocks were cured for 50 minutes at 285° F. The antioxidant efficiency was measured by aging the samples for 7 hours in an oxygen bomb at a temperature of 50° C. under a pressure of 150 pounds per square inch. The percent tensile retention and flex of both aged and unaged samples were used as measures of efficiency as shown in the following table. Flex is expressed as the number of minutes each sample functioned before failure in the sixty-six percent flex test described by R. B. Spacht and co-workers; Rubber World, vol. 139, pages 863–868.

*7 Hr. Air Bomb Aging—Natural Rubber Tread Stock—1% Antioxidant*

|  | Original Flex | Aged Flex Final | Percent Tensile Retention |
|---|---|---|---|
| Control—No Antioxidant | 109.5 | 33 | 27 |
| Phenyl-beta-naphthylamine | 158 | 58.5 | 35.5 |
| Para-beta-cyanoethylamino-diphenylamine | 115 | 86 | 59.5 |

The antiozonant properties of the compounds of this invention were tested in a butadiene-styrene tread stock according to the following formulation:

GRS 1500 _____ 100.0
Carbon black _____ 50.0
Processing oil _____ 7.0
N-cyclohexyl-2-benzothiazole sulfenamide __ 1.25
Sulfur _____ 2.0
Zinc Oxide _____ 6.0
Wax _____ 1.5
Antiozonant _____ 4.0

The test samples were cured for 90 minutes at 285° F. and aged for 24 hours after which they were exposed to 50 p.p.h.m. O₃.

*Ozone Resistance—GRS Tread Stock—4% Antiozonant*
[Exposed to 50 p.p.h.m. O₃; Aged 24 hrs. before exposure]

| Compound | Time to first crack, min. | |
|---|---|---|
|  | Aged at 100° F. | Aged at 100° C. |
| Control (No antioxidant) | 23 | 41 |
| Para-(beta-cyanoethylamino) diphenylamine | 42 | 275 |

The above materials showed good ozone resistance compared with a control when immersed for 15 minutes in 10,000 p.p.h.m. of ozone.

EXAMPLE II

The para-(beta-cyanoethylamino) diphenylamine prepared in accordance with Example I was evaluated as an antioxidant for highly refined hydrocarbons by mixing 0.025 gram of the product in a liter of catalytically cracked gasoline and subjecting a portion of the gasoline solution to the ASTM Oxidation Stability Test (ASTM-D-525-46). Tests were also run on a gasoline sample containing a similar amount of a commercial antioxidant and on a control wherein the gasoline contained no antioxidant. The Oxidation Stability Test consists essentially of placing 50 cc. of the composition being tested in a bomb, after which oxygen is added to provide a pressure of about 100 lbs. p.s.i.g. This bomb is then heated to about 100° C. and the pressure in the bomb determined at 15-minute intervals. When sufficient time has passed so that the pressure drops two pounds p.s.i.g. in 15 minutes, the test is discontinued and the time required to reach this condition is recorded as the induction period or the ASTM breakdown time and is normally given in minutes.

| Antioxidant: | Induction period (minutes) |
|---|---|
| Control (no antioxidant) | 200 |
| Ionol (2,6-di-tert-butyl-4-methyl phenol) (commercial) | 346 |
| P - (beta - cyanoethylamino) diphenylamine (from Example I) | 662 |

This example clearly illustrates the very effective antioxidant properties of para-(beta-cyanolkylamino) diphenylamines in a refined hydrocarbon.

Although this invention has been described with reference to pure compounds, mixtures of the several materials claimed herein can be used in the practice of the invention.

The rubbers which can be protected by the products of this invention are the oxidizable rubbery polymers of conjugated dienes which include natural rubber and the various synthetic diene rubbers which are similar to natural rubber in their aging characteristics, such as polychloroprene; polyisoprene; polymers and copolymers of butadiene such as butyl rubber, which is a polymerization product of a major proportion of a mono olefin, such as isobutylene, and a minor proportion of a multi olefin, such as butadiene or isoprene; the rubbery copolymers of butadiene and styrene which may contain from 50 to 75% by weight of butadiene and the rubbery copolymers of butadiene and acrylonitrile.

The products of the invention are useful as age resistors for raw rubbers in latex form, coagulated rubber latices or vulcanized rubbers, and may be present in an amount of from 0.25 to 5.0% by weight, based on the weight of the rubber, although it is generally preferred to use from 0.5 to 2.0% by weight, based on the weight of rubber.

The antioxidants of this invention can be incorporated into rubber in any customary manner. They may be added in the form of physical mixtures or in the form of emulsions using any of the known emulsifiers such as monovalent metal hydroxides, fatty acids, organic soaps, etc. They may be added to the rubber in the form of latex, or they may be milled into coagulated rubber in the usual manner.

The various highly refined hydrocarbons which can be protected by the products of this invention can be described as catalytically cracked, thermally cracked gasoline or blends thereof. Higher boiling fractions such as kerosene, fuel oil, and diesel oils are also included within the scope of this invention.

The compounds of this invention can be used to stabilize the highly refined hydrocarbons by adding about .001% to 0.1% by weight of the antioxidant to the highly refined hydrocarbons.

While certain representative embodiments and details have been shown for the purpose of illustrating the invention, it will be apparent to those skilled in this art that various changes and modifications may be made therein without departing from the spirit or scope of the invention.

This application is a continuation-in-part of Serial Number 724,525 filed March 28, 1958 now U.S. Patent 3,008,921.

What I claim is:

1. As a composition of matter, a para-(beta-cyanolkylamino) diphenylamine conforming to the following structure:

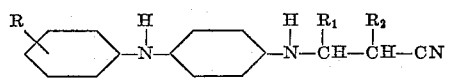

wherein R is selected from hydrogen, alkoxy radicals having from 1 to 9 carbon atoms and alkyl radicals having from 1 to 9 carbon atoms and wherein $R_1$ and $R_2$ are selected from hydrogen, phenyl and alkyl radicals having from 1 to 4 carbon atoms.

2. As a composition of matter, para-(beta-cyanoethylamino) diphenylamine.

3. As a composition of matter, 4-(beta-cyanoethylamino)-4'-methyldiphenylamine.

4. As a composition of matter, 4-(beta-cyanoethylamino)-4'-methoxydiphenylamine.

5. As a composition of matter, 4-(alpha-methyl-beta-cyanoethylamino)-4'-methyldiphenylamine.

6. As a composition of matter, 4-(beta-cyanoethylamino)-2'-methyldiphenylamine.

References Cited in the file of this patent

UNITED STATES PATENTS

| | | |
|---|---|---|
| 2,038,631 | Bennett et al. | Apr. 28, 1936 |
| 2,109,024 | Holzach et al. | Feb. 22, 1938 |
| 2,200,343 | Ritter | May 14, 1940 |
| 2,449,006 | Parker et al. | Sept. 7, 1948 |
| 2,498,630 | Thompson | Feb. 28, 1950 |
| 2,555,127 | Gunther | May 29, 1951 |
| 2,714,614 | Weinmayr | Aug. 2, 1955 |

OTHER REFERENCES

Bergmann: "Acetylene Chemistry," 1948, page 80.

Bruson: "Organic Reactions," 1949, volume 5, pages 82–87.